United States Patent
Yang et al.

(10) Patent No.: US 6,747,791 B1
(45) Date of Patent: Jun. 8, 2004

(54) OPTICAL AMPLIFIER WITH A SPECTRAL GAIN MONITOR USING A VOLUME PHASE GRATING

(75) Inventors: William Wei Yang, Fremont, CA (US); Li Chen, Fremont, CA (US); Frank H. Levinson, Palo Alto, CA (US); Danny Deiin Yu, Fremont, CA (US); Charlie Shu Zhang, Fremont, CA (US); Chase Changqing Wang, Fremont, CA (US); Wilson Wenhul Liu, Fremont, CA (US)

(73) Assignee: Bayspec, Inc., Fremont, CA (US)

( * ) Notice: Subject to any disclaimer, the term of this patent is extended or adjusted under 35 U.S.C. 154(b) by 0 days.

(21) Appl. No.: 10/310,127

(22) Filed: Dec. 3, 2002

(51) Int. Cl.⁷ ................................................ H01S 1/00
(52) U.S. Cl. ................. 359/337.1; 359/341.41
(58) Field of Search ............ 359/341.4, 341.41, 359/337.1, 337.11

(56) References Cited

U.S. PATENT DOCUMENTS 6,038,061 A * 3/2000 Sugaya .................... 359/337
6,343,170 B1 * 1/2002 Sela ........................ 385/37
6,529,319 B2 * 3/2003 Youn et al. ............ 359/341.41
6,580,553 B2 * 6/2003 Kim et al. ............. 359/341.41
2003/0053750 A1 * 3/2003 Yang et al. ............... 385/27

FOREIGN PATENT DOCUMENTS

JP    2003163643 A  *  6/2003

* cited by examiner

Primary Examiner—Mark Hellner
(74) Attorney, Agent, or Firm—Justin Boyce; Dechert LLP

(57) ABSTRACT

An optical amplifier system for amplifying an input wavelength division multiplexed (WDM) optical signal with a first optical coupler to extract a portion of the power of the input signal, an erbium-doped fiber amplifier to generate an output signal and a second optical coupler to extract a portion of the power of the output signal. A spectral monitoring unit having a volume phase grating separates the extracted input and output signals into spectral components. A photo-detector array of the spectral monitoring unit determines the power level of the spectral components. The system further includes a controller operative to control the operation of the amplifier in response to the power levels of the spectral components.

39 Claims, 7 Drawing Sheets

300

OPTICAL AMPLIFIER WITH A SPECTRAL GAIN MONITOR USING A VOLUME PHASE GRATING

BACKGROUND OF THE INVENTION

1. Field of the Invention

The present invention generally relates to an optical amplifier with spectral gain monitoring functions and in particular to a compact erbium-doped fiber amplifier (EDFA) with gain spectrum and optical performance dynamically controlled.

2. Status of the Prior Art

The past decade has witnessed a rapid growth in the volume of high-speed data traffic carried over national and international communication networks. This growth has been driven principally by the dramatic increase in the wide use of the Internet and commercial data networks. This tremendous amount of worldwide data traffic volume requires fiber-optic communications networks having multi-gigabit transmission capacities with highly efficient cross-connect links. To this end, in the field of fiber-optic technology, products have been developed for multi-carrier transmission over a single fiber thereby multiplying the amount of information capacity transmitted over a single carrier system. By assembling several individual data signals of different wavelengths into a composite multi-channel signal transmitted on a single fiber(i.e., wavelength division multiplexing (WDM)), it is possible for multiple users to share a common fiber-optic link and thereby realize high throughput.

To assemble the multi-channel signals, a multiplexing device (MUX) is employed at the transmitting end that combines the multiple light-wave signals from several sources or channels of different wavelengths into a single composite signal. The center wavelengths of the signals must be properly spaced and have pass bands well defined in order to avoid cross-talk between channels. For example, the well-accepted industrial standard is a channel spacing of 100 GHz (0.8 nm in 1.55 $\mu$m window) centered at the ITU grid wherein each signal channel has a pass bandwidth of 0.3 nm at 0.5 dB down power level. The multiplexed signal is then transmitted on a single fiber-optic communications link. At the receiving end, a demultiplexing device (DEMUX) separates the composite signal received from the fiber link into the original channel signals, each of which is a single signal channel centered at the ITU grid. Such dense wavelength division multiplexing (DWDM) technology dramatically increases the information-carrying capacity that is transmitted on a single carrier fiber. For example, a 40-channel 100 GHz DWDM system with a 10 Gb/s transmission rate can transmit 400 Gb/s data in the C-band (1528–1563 nm). The number of channels deployed in long-haul DWDM systems is rapidly increasing to beyond 100 channels over the C-band and L-band (1575–1610 nm).

In optical networks having a large number of channels, the stability of the channels (both in terms of the amplitude and wavelength) is critical. The stability of channels in optical networks is largely dependent on the operational characteristics of the optical amplifiers, optical transmitters, and network architecture.

As the multi-wavelength signals propagate along the optical fibers, the powers of the signals are gradually decayed due to the presence of insertion, distribution, and transmission losses. To boost the signal powers, optical amplifiers are employed periodically to compensate for the power loss. Optical amplifiers receive one or more optical signals and simultaneously amplify all wavelengths. This is a significant advantage of multi-wavelength fiber systems over regenerators. However, not all channels are amplified by the same factor because the gain spectrum of the optical amplifier is not uniform. For example, the gain spectrum of an EDFA has well-known asymmetrical twin peaks due to a luminescent spectrum caused by the fine structure of the energy levels. Because the gain spectrum is not flat, a power deviation exists between the amplified signals that corresponds to the different wavelengths. Though a gain flattening technique can resolve this, it is important to monitor power fluctuations of individual channels, rather than aggregate power.

It is also well known that the wavelength and amplitude of the light emitted by the lasers tends to vary as the lasers age and as the operational temperature of the lasers changes. As the number of channels deployed in a WDM optical network increases, wavelength drifts are more likely to result in interference between channels because the channel spacing is narrower. As a result, wavelength drifts and amplitude variations are more likely to cause data error or transmission failures. These variations of optical performance will inevitably lead to fluctuations of the amplification characteristics of optical amplifiers.

The presence or absence of individual channels across the whole gain band has an important influence on the characterization of optical performance of optical amplifiers. In some cases, for example, a channel may be absent such that extra amplification of the other existing channels will result. It is obvious that as more channels are absent, channel amplification becomes a more serious problem.

It is therefore important to monitor the performance of an optical amplifier in an optical network, and in particular the individual channels. To do so, external channel performance monitors have been used in conjunction with optical amplifiers. A compact channel performance monitor is described in U.S. patent application Ser. No. 09/715,765 filed Nov. 17, 2000 titled COMPACT OPTICAL PERFORMANCE MONITOR, the contents of which are incorporated herein by reference. The channel performance monitor can be tailored and integrated into an optical amplifier.

SUMMARY OF THE INVENTION

The present invention provides a method and system of integrating optical amplifiers with a spectral monitor. The spectral gain monitor is a compact module having a low-cost volume phase grating (VPG) optical element, a compact photo-detector array and a micro-processor controller. It is initially designed for EDFAs, but not limited to.

A primary object of the present invention is to provide a compact design of a low-cost optical amplifier system with spectral gain monitoring capabilities based on erbium-doped fiber amplifiers and VPG technology. The present invention provides a method for designing optical amplifiers with spectral gain monitoring capabilities for Raman amplifiers and other semiconductor optical amplifiers. Accordingly, a method is provided for designing a multichannel device with spectral gain monitoring capabilities.

In the preferred embodiments of the present invention, an optical amplifier with spectral gain monitoring capabilities is provided wherein individual channel powers (including the presence or absence of some channels) are monitored. Feedback control to stabilize variation of optical performance is also provided.

In accordance with the present invention, there is provided a system for amplifying an input wavelength division multiplexed (WDM) optical signal with a first optical coupler operative to receive the input WDM optical signal and extract a portion of the signal therefrom. The system further includes a first spectral monitoring unit having a volume phase grating optically connected to the first coupler. The first spectral monitoring unit separates the input WDM optical signal into input spectral components (i.e., prescribed channels) and detects the power levels thereof. An optical amplifier is optically connected to the first coupler and amplifies the input WDM optical signal to generate an amplified output WDM optical signal. The optical amplifier may be a laser pump source optically connected to an erbium-doped fiber. A second optical coupler is optically connected to the optical amplifier and extracts a portion of the output WDM optical signal. The system has a second spectral monitoring unit with a volume phase grating optically connected to the second optical coupler. The second spectral monitoring unit separates the output WDM optical signal into output spectral components (i.e., prescribed channels) and detects the power levels thereof. A controller is electrically connected to the first spectral monitoring unit, the second spectral monitoring unit and the optical amplifier. The controller dynamically operates the amplifier in response to the power levels of the input and output spectral components. In this regard, it is possible for the amplifier to dynamically adjust the amplification of the input optical signal in response to the power in the channels.

The first and second spectral monitoring units separate and detect the power level in the spectral components of the extracted input and output signals. Accordingly, the spectral monitoring units each have an input fiber for receiving the optical signal and a collimating lens optically connected to the input fiber. The collimating lens emits the optical signal onto the volume phase grating which separates the optical signal into spectral components. Each of the first and second spectral monitoring units further include a focusing lens for focusing the spectral components onto a photo-detector array which detects the power level of each of the spectral components. The photo-detector array has a plurality of photo-detectors wherein each of the photo-detectors correspond to one of the spectral components. In this regard, each of the photo-detectors detects the power level of a respective one of the spectral components.

It will be recognized by those of ordinary skill in the art that the amplifier system may operate with only a single spectral monitoring unit. In this regard, the spectral monitoring unit will determine the power levels of each of the spectral components by processing the extracted input and output optical signals either in a serial manner or parallel manner. For instance, if the signals are processed in a serial manner, an optical switch will be used to switch between the extracted input and output signals. If the signals are processed in a parallel manner, the volume phase grating, as well as the photo-detector array, will be configured to receive both the extracted input and output optical signals simultaneously.

In accordance with the present invention, there is provided a method of amplifying an input optical signal with an optical amplifier system having a first and second optical coupler, a spectral monitoring unit, an optical amplifier, and a controller. The method starts by extracting a portion of the input WDM optical signal with the first optical coupler. Next, the input WDM optical signal is amplified with the optical amplifier in order to generate an output WDM optical signal. A portion of the amplified output WDM optical signal is extracted with the second optical coupler. The spectral monitoring unit separates the spectral components of the extracted input and output WDM signals and detects the power levels of the spectral components. The controller dynamically operates the optical amplifier in response to power levels of the spectral components. In this regard, the controller can control the amplification of the input WDM optical signal in order to provide uniform amplification.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENTS

Figure 1:
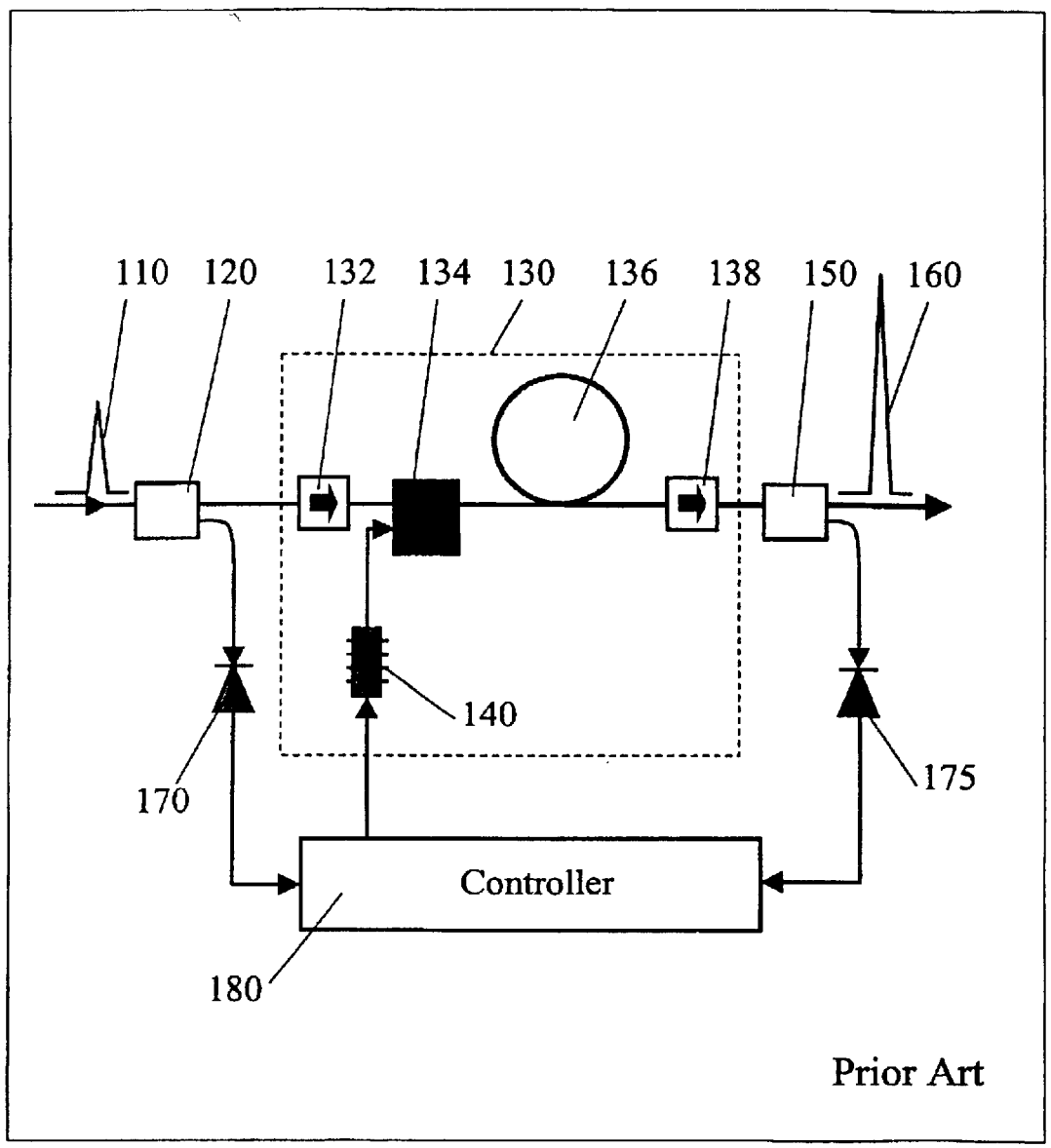
FIG. 1 is a system block diagram of a prior art optical amplifier having an erbium-doped fiber with a single forward pumping source.

Referring now to the drawings wherein the showings are for purposes of illustrating preferred embodiments of the present invention only, and not for purposes of limiting the same, FIG. 1 illustrates an optical amplifier system 100 for increasing the gain of an optical signal. Most optical amplifier systems used in DWDM fiber-optic communications networks use erbium-doped fiber amplifiers (EDFAs) that boost optical power across the C-band. FIG. 1 shows a prior art EDFA system 100 having three stages: 1) pump-amplification stage 130; 2) monitoring stage; and 3) controlling electronics stage 180. The system 100 includes a first and second coupling device 120 and 150 respectively to receive an optical WDM input signal 110 and generate an amplified optical WDM output signal 160. The system 100 also has first and second optical isolators 132 and 138 optically connected to respective coupling devices 120 and 150. The first optical isolator. 132 is optically coupled to the output of the first coupler 120 and ensures that the optical signal from the coupler 120 travels in the desired direction. Similarly, the second optical isolator 138 is connected to the input of the second coupler 150. The system 100 also has a WDM coupler 134 with an input optically connected to the output of the first isolator 132. An erbium-doped fiber 136 is optically connected to the output of the WDM coupler 134 and receives the optical signal therefrom. A pump laser 140 is coupled to another input of the first WDM coupler 134 to amplify the optical input signal 110. The system 100 further includes first and second photo-detectors 170 and 175 and controlling circuitry 180. The first photo-detector 170 is optically connected to an output of the first coupler 170 and the controller 180. Similarly, the second photo-detector 170 is optically connected to the output of second coupler 150 and the controller 180. The controller 180 is also electrically connected to the pump laser 140 in order to control the operation thereof.

In the operation of the system 100, the EDFA 136 is pumped by the higher optical frequency laser source (980 nm or 1480 nm) 140. The EDFA 136 and the pump laser 140 are optically coupled via the WDM coupler 134. The first isolator 132 is used to prevent light from reflecting into the incoming fiber and the second isolator 138 is used to suppress reflection from the outgoing fiber. The first coupler 120 extracts a small fraction of the incoming power (typically 2%) from the input signal 110 for power monitoring purposes. The input power level is detected by the photo-detector 170 and the value thereof is sent to the controller 180. Similarly, the second coupler 150 extracts a small fraction of the output power (typically 2%) from the amplified output signal 160 in order to measure the aggregate output power. The amplified power level is detected by the photo-detector 175 and is also sent to the controller 180. The gain of the system 100 is defined as $G=P_{out}/P_{in}$, where $P_{in}$ is the power measured at the first photo-detector 170 and $P_{out}$ is the power measured at the second photo-detector 175. Two drawbacks of the system 100 shown in FIG. 1 are: 1) the gain G is estimated according to the total power and spectral details are hidden; and 2) the pump efficiency is low.

Figure 2:
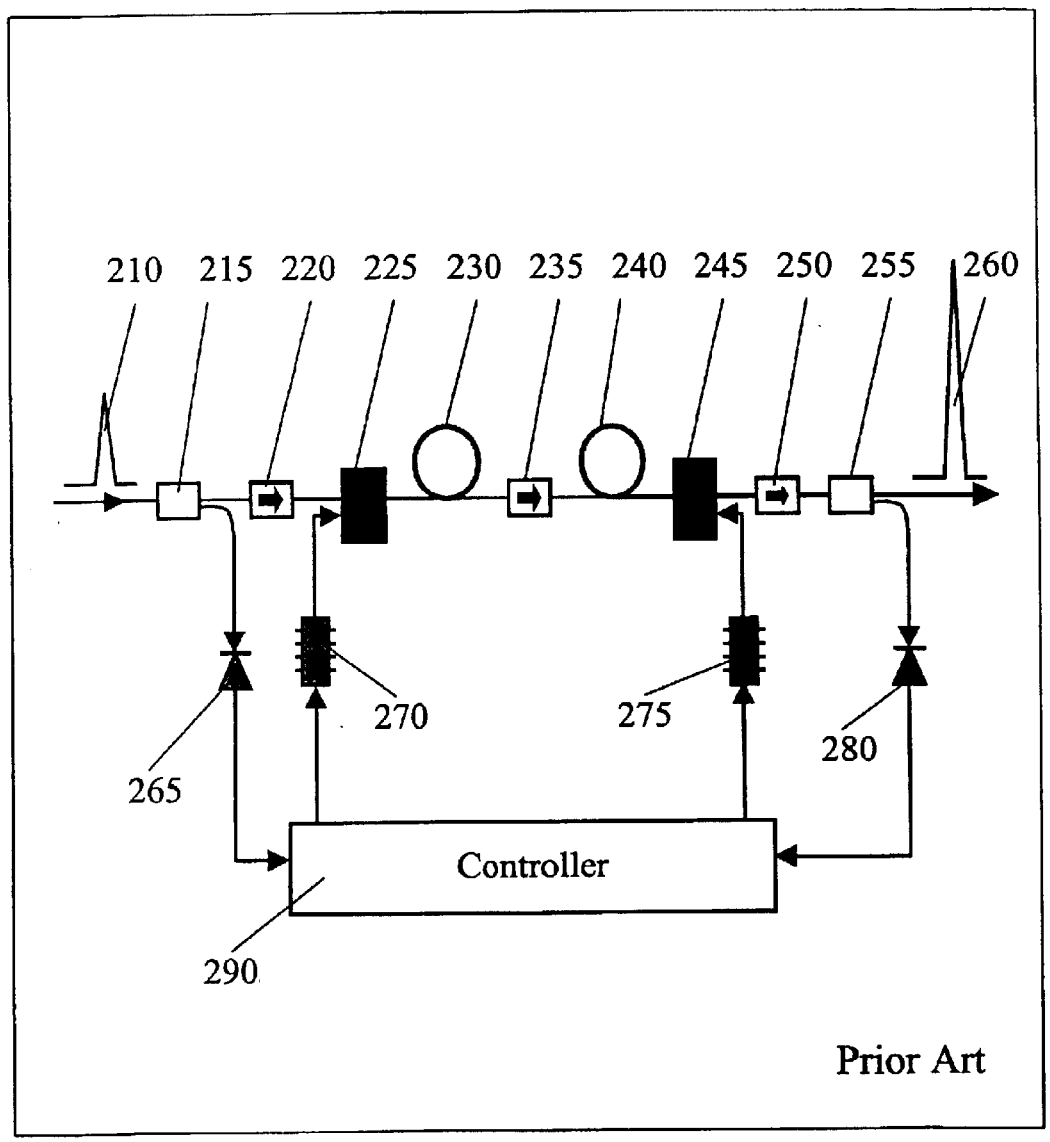
FIG. 2 is a system block diagram of a second prior art optical amplifier having two erbium-doped fibers with one forward and one backward pumping source.

Pump efficiency can be improved by using a bi-directional pumping scheme. A prior art bi-directionally-pumped EDFA system 200 is shown in FIG. 2. The system 200 has a first coupler 215 for receiving an input optical signal 210 from an input fiber. The first coupler 215 has a first output optically connected to a first photo-detector 265 which receives a small fraction of the power (about 2%) from the first coupler 215. The first photo-detector 265 is electrically connected to a controller 290 in order to measure the power level detected by the first photo-detector 265. A second output of the first coupler 215 is optically connected to an input of a first optical isolator 220 that prevents reflection back into the input optical fiber. The output of the first optical isolator 220 is fed into an input of a first WDM coupler 225.

The system 200 further includes a first pump laser 270 which is operated by the controller 290. The first pump laser 270 has an output optically connected to an input of the first WDM coupler 225. The output of the first WDM coupler 225 is optically connected to a first erbium-doped fiber 230. A second optical isolator 235 connects the output of the first erbium-doped fiber 230 to the input of a second erbium-doped fiber 240.

The system 200 also has a second pump laser 275 operating at the wavelength of 1480 nm that is optically coupled to the second erbium-doped fiber 240 via a second WDM coupler 245. The output of the second WDM coupler 245 is optically connected to a third optical isolator 250 which has an output coupled to an input of a second coupler 255. An input of a second photo-detector 280 is optically connected to an output of the second coupler 255. In this regard, the second photo-detector 280 receives a small fraction of the power (about 2%) from the second coupler 255. The second photo-detector 280 is electrically connected to the controller 290 in order to measure the power level detected by the second photo-detector 280. The amplified output signal 260 is available at an output fiber at an output of the second coupler 255.

The operation of the system 200 is similar to the operation of system 100 shown in FIG. 1. Specifically, the controller 290 determines the aggregate power from both the first photo-detector 265 and the second photo-detector 280 in order to control the amplification process. The controller 290 operates both the first and second pump lasers 270 and 275 in order to produce the desired amplified output signal 260. It is highly desirable to know the power levels of individual channels in the input and output signals rather than simply measuring the aggregate power over the whole amplified band so that a constant gain can be provided. To this end, prior art channel performance monitors may be used. One channel monitor may be positioned before the EDFA while another channel monitor is positioned after the EDFA. The performance monitors are linked to a center controller to compute the gain of each channel. However, the performance monitors are expensive and not economic to use.

Figure 3:
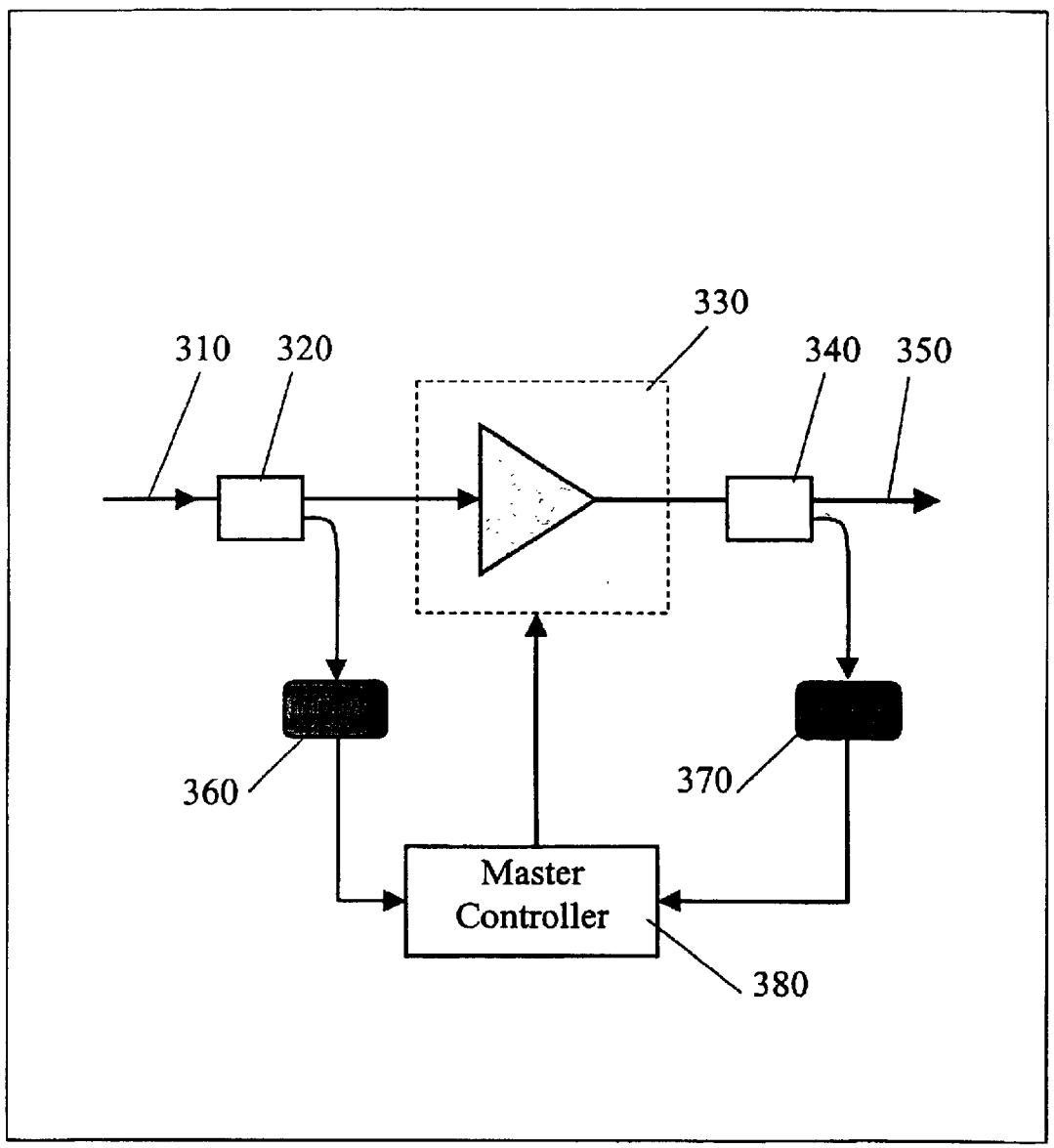
FIG. 3 is a system block diagram showing a first embodiment of an optical amplifier having two spectral gain monitoring units with volume phase grating dispersion elements.

Referring back to FIG. 1, the two photo-detectors 170 and 175 can be replaced by two spectral-resolved units. One of the preferred embodiments of the present invention uses a pair of volume phase grating (VPG) based spectral monitor so that detailed power levels of individual channels can be obtained. Referring to FIG. 3, an amplifier system 300 constructed according to a first embodiment of the present invention is shown. An input signal 310 from an input fiber is divided into two parts by a first coupler 320 with a power ratio of 98:2. A majority of the power (about 98%) enters an amplifier unit 330 having an erbium-doped fiber and a pump laser source (i.e., EDFA). The power of the remaining weak signal (about 2%) separated by the coupler 320 is sent to a spectral monitoring unit 360 which measures the power distribution of the input signal. The spectral monitoring unit 360 is electrically connected to a master controller 380 in order to transmit the power distribution of the input signal 310 to the master controller 380. A second spectral monitoring unit 370 is employed to provide the amplified power levels of the output signal. Specifically, the second spectral monitoring unit 370 receives the output signal from a second coupler 340 that is optically connected to the amplifier unit 330. The second coupler 340 divides the output signal into two parts with a ratio of 98:2. A majority of the output power (about 98%) is outputted in the output signal 350. The remaining power of the signal (about 2%) is transmitted to the second spectral monitoring unit 370. The second spectral monitoring unit 370 detects the spectral distribution of the outgoing signal 350. The power distribution of the output signal measured by the second spectral monitoring unit 370 is then transmitted to the master controller 380 that is electrically connected therewith.

The gain for a certain channel can be specified and defined as the ratio between the output power and the input power corresponding to the desired wavelength channel (i.e., spectral component). By determining the power of each particular channel, the aggregate power and hence the aggregate gain can be obtained accordingly. The master controller 380 can use the power level information detected by the first and second spectral monitoring units 360 and 370, together with the specified gain, to dynamically adjust the pump rate. The erroneous setting of pump parameters is therefore avoided.

The first and second spectral gain monitoring units 360 and 370 are similar to a channel performance monitor but emphasize spectral power detection capabilities. A VPG-based diffraction element and detector array can be used as the spectral gain monitoring units 360 and 370. Specifically, referring FIG. 4, a spectral gain monitoring unit 400 that can be used as the first and second spectral gain monitoring units 360 and 370 is shown. The spectral gain monitoring unit 400 has a receiving fiber 410, a collimating lens 430, a transmission volume phase grating (VPG) 440, a focusing lens 460, a detector array 470, and an electrical link 480. The receiving fiber 410 receives the incoming optical signal from the coupler 320 shown in FIG. 3 and emits an input beam 420 onto the collimating lens 430. The collimated beam after the lens 430 is incident upon the VPG 440 at a preferable angle so that the Bragg condition is satisfied for the grating. The VPG 440 is characterized by its grating constant, thickness and modulation depth of the refractive index. The VPG 440 separates the optical signal into spectral components (i.e., prescribed channels). After the VPG 440, each spectral component 450 of the input light signal propagates in a particular direction in space. The focusing lens 460 directs a narrow band of each desired channel signal to a corresponding photo-detector of the detector array 470. All the photo-detectors of the detector array 470 are arranged in such a way that the two adjacent units precisely correspond to two adjacent wavelength channels. The dependence of the polarization of the light signal is less important because only power values are relevant. The power level of each channel detected by each photo-detector and is transmitted to the master controller 380 with electrical link 480. In this regard, it is possible to determine the power level for each channel with the spectral gain monitoring unit 400.

Figure 5:
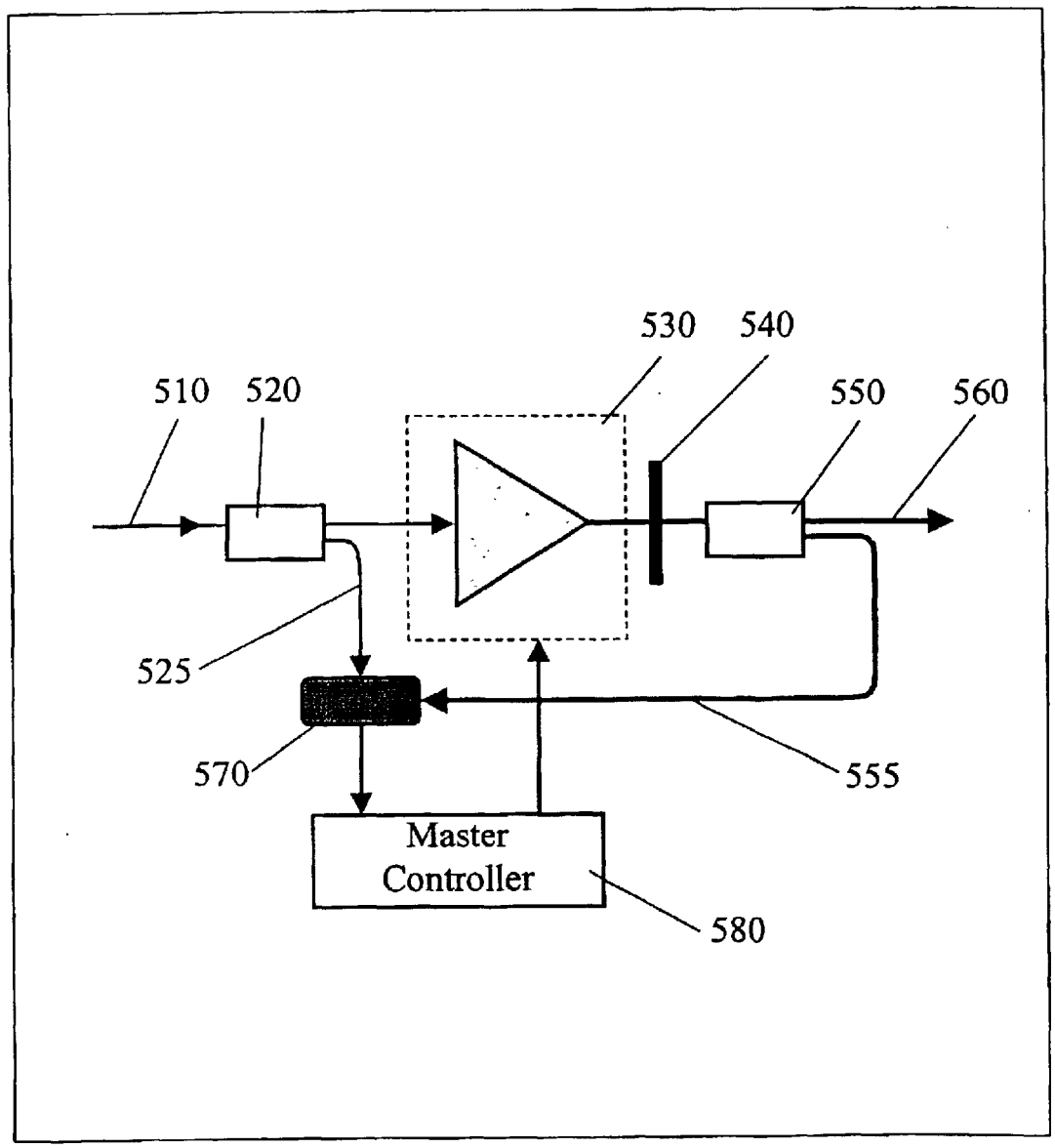
FIG. 5 is a system block diagram showing a second embodiment of an optical amplifier using one spectral gain monitoring unit to measure input and output power distributions.

The first and second spectral gain monitoring units 360 and 370 shown in FIG. 3 can be integrated into a single unit. Referring to FIG. 5, an amplifier unit 500 constructed according to a second embodiment of the present invention and using a single spectral gain monitoring unit 570 is shown. An input signal 510 from an input fiber is divided into two parts by a first coupler 520 with a power ration of 98:2. A majority of the power (about 98%) from the input signal 510 enters amplifier unit 530 that has an erbium-doped fiber and pump laser source (i.e., EDFA). The power of the remaining weak signal (about 2%) from the first coupler 520 is directed to a spectral monitoring unit 570. After amplification by the amplifying unit 530, the optical signal is passed through a gain flattening filter 540 that is either static or dynamic. For EDFAs, a static gain flattening filter is sufficient. After passing through the gain flattening filter 540, the optical signal is inputted into a second coupler 550 which divides the signal into two parts. A majority of the power (about 98%) is outputted from the second coupler 550 as output signal 560. The power of the remaining weak signal (about 2%) from the second coupler 550 is inputted into the spectral monitoring unit 570. The input power of the input signal 510 extracted by the first coupler 520 and the output power of the output signal 560 extracted by the second coupler 550 are sent to the spectral monitoring unit 570. The two power distributions are processed either in parallel or in series by the spectral monitoring unit 570 as described below in order to provide a low-cost compact design.

Figure 6:
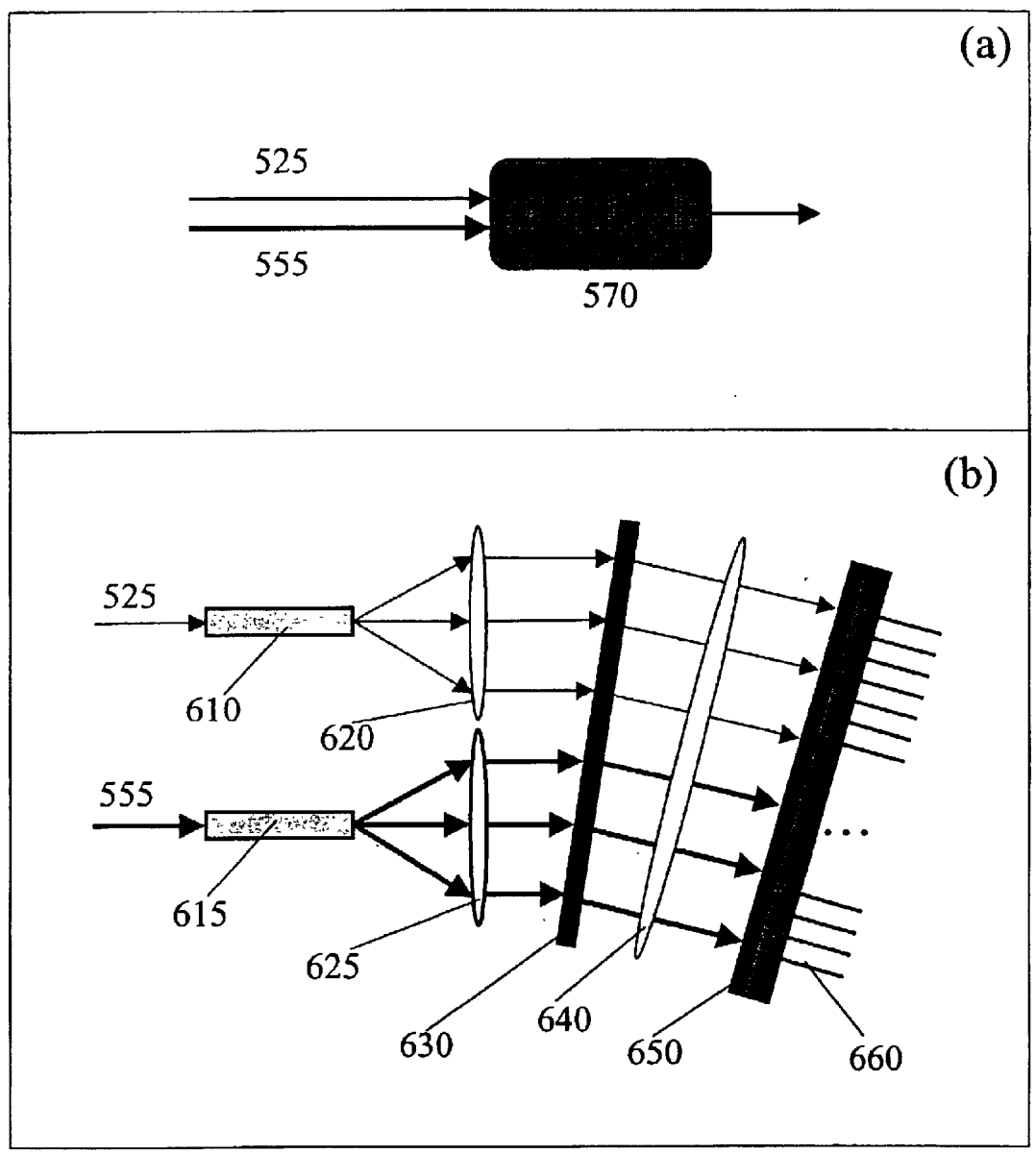
FIG. 6 is an illustration of the spectral gain monitoring unit of FIG. 5.

A parallel processing scheme for the spectral monitoring unit 570 is shown in FIG. 6. Referring to FIG. 6(a), two incident signals 525 and 555 from respective first and second couplers 520 and 550 enter the spectral gain monitoring unit 570 at the same time. Referring FIG. 6(b), the spectral gain unit 570 for parallel processing of the two incident signals 525 and 555 has first and second input fibers 610 and 615, first and second collimating lenses 620 and 625, a VPG 630, a focusing lens 640, and a detector array 650 with electrical link 660. The first input fiber 610 receives the optical signal 525 from the first coupler 520 (FIG. 5). The first input fiber 610 emits the optical signal 525 onto the first collimating lens 620. Similarly, the second input fiber 615 receives the optical signal 555 from the second coupler 550 and emits the signal onto collimating lens 625. The beams collimated after collimating lenses 620 and 625 are incident upon the VPG 630 at an angle so that the Bragg condition is satisfied for the grating. The VPG 630 is characterized by its grating constant, thickness and modulation depth of the refractive index. The VPG 630 separates the optical signals into each spectral component which are then incident upon the focusing lens 640. Accordingly, the focusing lens 640 directs each spectral component of the desired channels onto a corresponding photo-detector of the detector array 650. The photo-detectors of the detector array 650 are arranged in such a way that two adjacent units precisely correspond to the two adjacent wavelength channels. The VPG 630, focusing lens 640, and detector array 650 are configured such that an upper portion of the VPG 630 and detector array 650 detect the power of the input signal 525. Similarly, the VPG 630, focusing lens 640, and detector array 650 are configured such that a lower portion of the VPG 630 and detector array 650 detect the power of the output signal 555. In this regard, it is possible to monitor the power of each signal 525 and 555 with a single spectral monitor 570. The electrical link 660 transmits an electrical signal to the master controller 580 (FIG. 5) in proportion to the power of each channel in order to adjust the amplification of the amplifier unit 530. The spectral monitoring unit 570 requires a double-size VPG 630 and detector array 650 than that shown in FIG. 4 in order to detect the power in both of the signals 525, 555 simultaneously.

Figure 4:
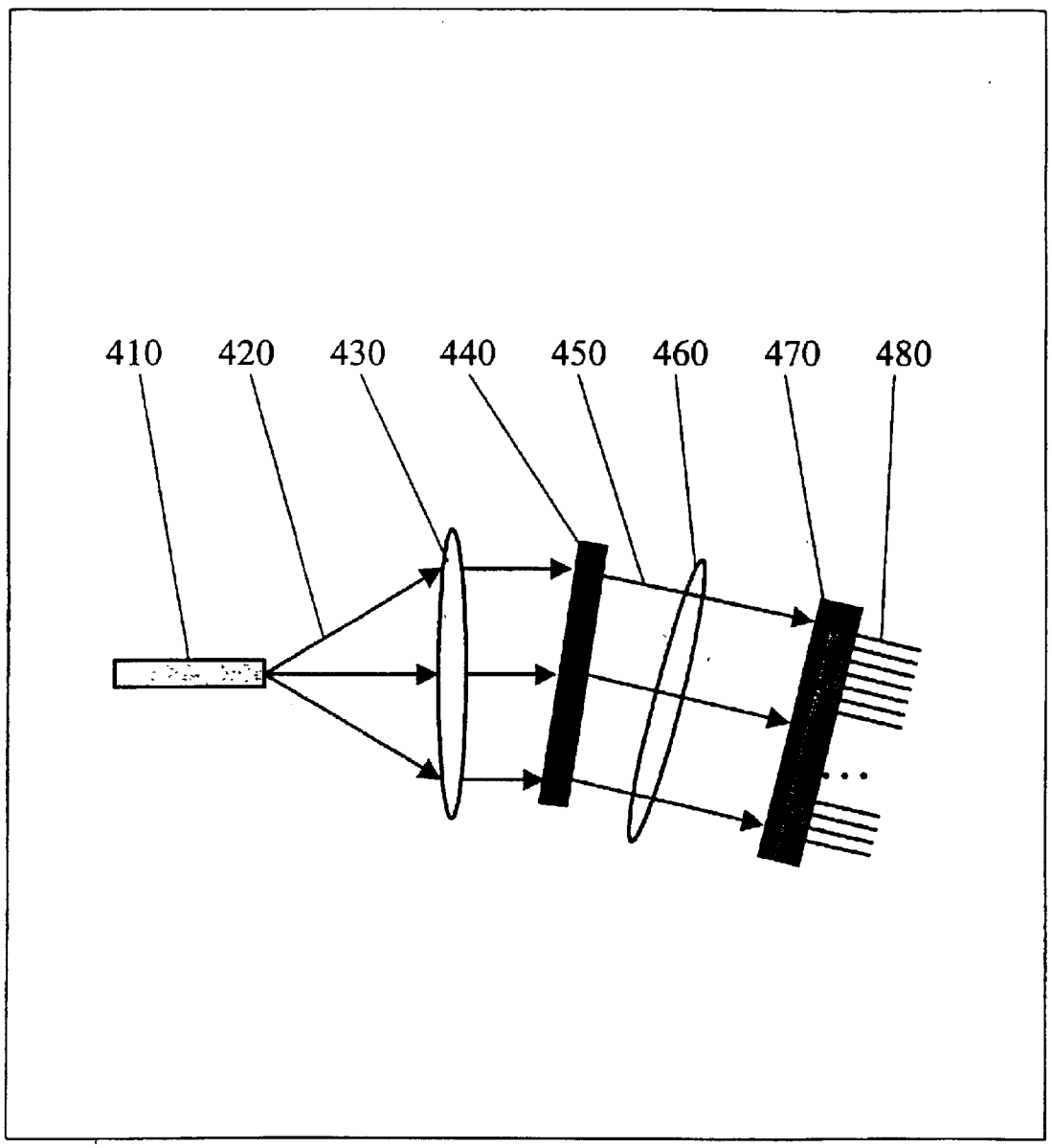
FIG. 4 is an illustration of the spectral gain monitoring unit of FIG. 3.
Figure 7:
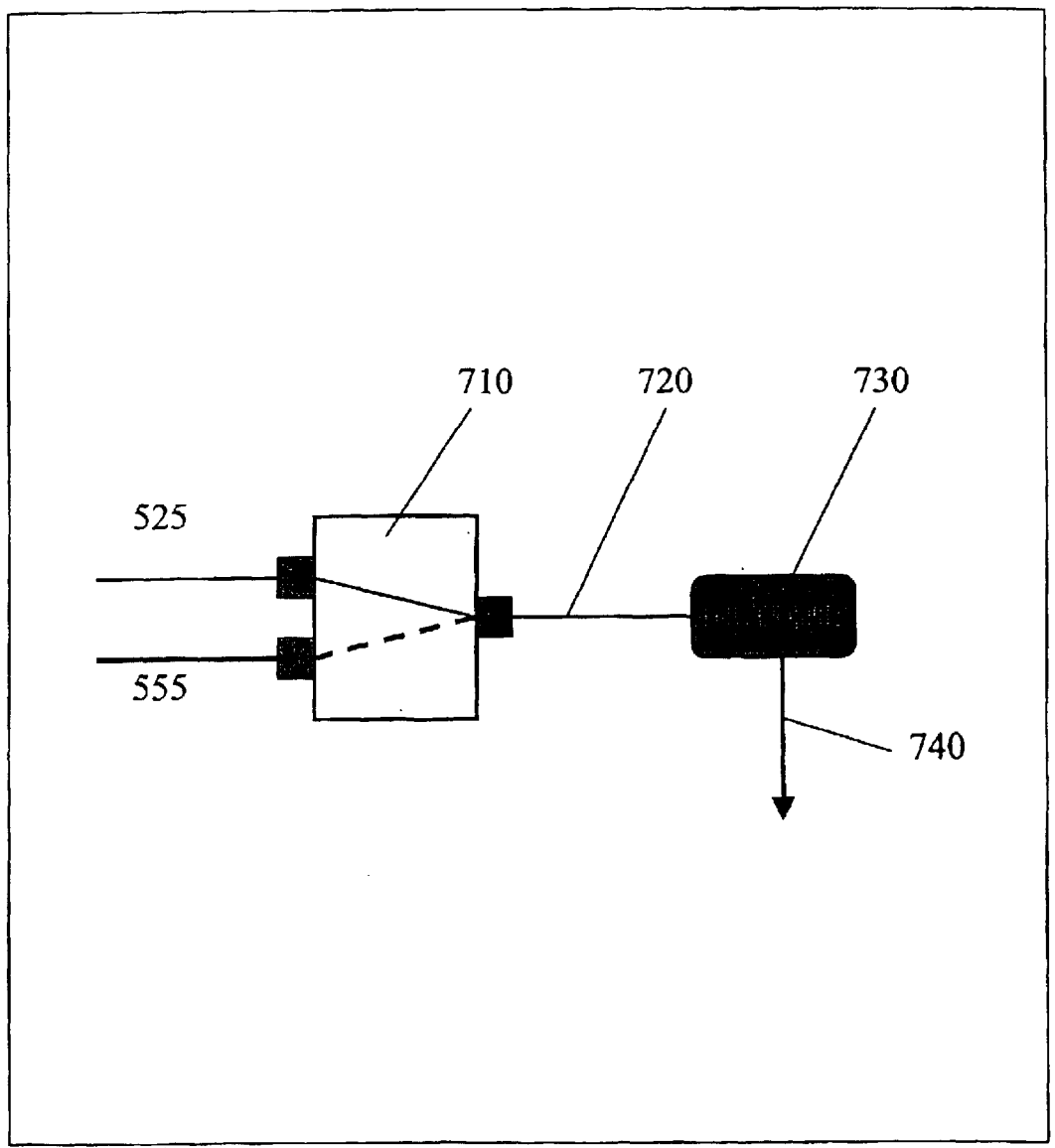
FIG. 7 is a system block diagram showing a spectral gain monitoring unit utilizing a 1×2 optical switch.

In addition to the foregoing, it is also possible to detect the power in both signals 525 and 555 using a serial processing configuration. Referring to FIG. 7, a serial spectral gain monitoring unit 700 for serial processing of two signals has a 1×2 optical switch 710 and a spectral gain monitoring unit 730 that is similar to the spectral gain monitoring unit 400 (FIG. 4). The switch 710 generates a time-division switching operation between the two incoming signals 525 and 555. The optical switch 710 connects either signal 525 or 555 to the monitoring unit 730 through transmission line 720. The switching operation can be managed by the master controller 580 (FIG. 5). Because only one signal, either 525 or 555, is optically processed, the spectral gain monitoring unit 730 can be the same as shown in FIG. 4. The monitoring unit 730 generates an electrical signal in proportion to the power of the optical signal on output line 740. The master controller 580 (FIG. 5) receives the signal from the output line 740 in order to determine the power in the signal. Because the master controller 580 can control the switching operation, the controller 580 can determine which signal corresponds to the power of either signal 525 or 555.

In summary, the present invention provides a new optical amplifier module having spectral monitoring capabilities. The optical amplifiers can provide precise power distribution across all wavelength channels before and after the multi-channel signal is amplified through the use of the spectral gain monitoring units having VPG elements. Furthermore, by using rugged VPG and detector array elements, a low-cost compact amplifier module design can be provided.

Additional modifications and improvements of the present invention may also be apparent to those skilled in the art. Thus, the particular combination of parts described and illustrated herein is intended to represent only certain embodiments of the present invention, and is not intended to serve as limitations of alternative devices within the spirit and the scope of the invention.

What is claimed is:

1. A system for amplifying an input wavelength division multiplexed (WDM) optical signal, the system comprising:
  a first coupler configured to receive the input WDM optical signal and extract a portion therefrom;

a first spectral monitoring unit having a volume phase grating and optically connected to the first coupler, the first spectral monitoring unit configured to detect the power level of prescribed channels in the extracted portion of the input WDM optical signal;

an optical amplifier optically connected to the first coupler and configured to amplify the input WDM optical signal and generate an amplified output WDM optical signal;

a second coupler optically connected to the optical amplifier and configured to extract a portion of the output WDM optical signal therefrom;

a second spectral monitoring unit having a volume phase grating and optically connected to the second coupler, the second spectral monitoring unit configured to detect the power level of prescribed channels in the extracted portion of the output WDM optical signal; and a controller electrically connected to the first spectral monitoring unit, the second spectral monitoring unit and the controller, the controller configured to receive the power levels in the prescribed channels in the extracted portions of the input and output signals and control the operation of the optical amplifier in response thereto.

2. The system of claim 1 wherein the optical amplifier comprises an erbium-doped fiber and a laser pump source.

3. The system of claim 1 wherein the first and second spectral monitoring units comprise:

an input fiber for receiving the optical signal;

a collimating lens in optical communication with the input fiber;

a volume phase grating in optical communication with the collimating lens, the volume phase grating configured to separate the optical signal from the focusing lens into the prescribed channels;

a focusing lens in optical communication with the volume phase grating; and a photo-detector array in optical communication with the focusing lens, the photo-detector array configured to detect the power level of the prescribed channels transmitted through the focusing lens.

4. The system of claim 3 wherein the photo-detector array has a plurality of photo-detectors positioned to detect the power level of the prescribed channels.

5. The system of claim 1 wherein the controller is configured to control the amplification of input WDM signal in response to each of the prescribed channels.

6. A optical signal amplifier system for amplifying a wavelength division multiplexed (WDM) input signal, the amplifier system comprising:

a first optical coupler configured to receive the WDM input signal and extract a portion thereof;

an optical amplifier in optical communication with the first optical coupler and configured to amplify the WDM input signal and generate a WDM output signal;

a second optical coupler in optical communication with the optical amplifier, the second optical coupler configured to extract a portion of the WDM output signal;

a spectral monitoring unit in optical communication with the first optical coupler and the second optical coupler, the spectral monitoring unit having a volume phase grating and configured to determine the power level in prescribed channels of the extracted input and output WDM signals; and a controller in electrical communication with the spectral monitoring unit and the optical amplifier, the controller configured to operate the optical amplifier in response to the power levels of the extracted input and output WDM signals.

7. The system of claim 6 wherein the spectral monitoring unit is configured to determine the power levels in the prescribed channels of the extracted input and output WDM signals in a parallel manner.

8. The system of claim 6 wherein the spectral monitoring unit is configured to determine the power levels in the prescribed channels of the extracted input and output WDM signals in a serial manner.

9. The system of claim 6 wherein the spectral monitoring unit comprises:

a first input fiber for receiving the extracted input WDM signal;

a first collimating lens in optical communication with the first input fiber;

a second input fiber for receiving the extracted output WDM signal;

a second collimating lens in optical communication with the second input fiber;

a volume phase grating in optical communication with the first collimating lens and the second collimating lens, the volume phase grating configured to separate the extracted input and output WDM signals into prescribed channels;

a focusing lens in optical communication with the volume phase grating; and a photo-detector array in optical communication with the focusing lens, the photo-detector array configured to detect the power level of each of the prescribed channels.

10. The system of claim 9 wherein the photo-detector array comprises a plurality of photo-detectors, each of the photo-detectors configured to detect the power level of a respective one of the prescribed channels.

11. The system of claim 6 further comprising an optical switch in optical communication with spectral monitoring unit, the extracted input WDM signal and the extracted output WDM signal, the optical switch configured to switch the input of the spectral monitoring unit between the extracted input WDM signal and the extracted output WDM signal.

12. The system of claim 11 wherein the spectral monitoring unit comprises:

an input fiber for receiving the optical signal;

a collimating lens in optical communication with the input fiber;

a volume phase grating in optical communication with the collimating lens, the volume phase grating configured to separate the optical signal from the focusing lens into the prescribed channels;

a focusing lens in optical communication with the volume phase grating; and a photo-detector array in optical communication with the focusing lens, the photo-detector array configured to detect the power level of respective ones of the prescribed channels transmitted through the focusing lens.

13. The system of claim 12 wherein the optical switch is configured to switch between the extracted input WDM signal and the extracted output WDM signal by the controller.

14. A method of amplifying an input WDM optical signal with an optical amplifier system having a first and a second optical coupler, a first and a second spectral monitoring unit, an optical amplifier, and a controller, the method comprising the steps of:

a) extracting a portion of the input WDM optical signal with the first optical coupler;
b) separating the extracted portion of the input WDM optical signal into prescribed spectral components with the first spectral monitoring unit;
c) detecting the power level of each of the spectral components of the extracted input WDM optical signal with the first spectral monitoring unit;
d) amplifying the input WDM optical signal with the optical amplifier in order to generate an output WDM optical signal;
e) extracting a portion of the output WDM optical signal with the second optical coupler;
f) separating the extracted portion of the output WDM optical signal into prescribed spectral components with the second spectral monitoring unit;
g) detecting the power level of each of the spectral components of the extracted output WDM optical signal with the second spectral monitoring unit; and
h) controlling the optical amplifier with the controller in response to the power levels of the spectral components of the extracted input WDM optical signal and the extracted output WDM optical signal.

15. The method of claim 14 wherein the first spectral monitoring unit comprises a volume phase grating and step (b) comprises separating the extracted portion of the input WDM optical signal into prescribed spectral components with the volume phase grating.

16. The method of claim 14 wherein the second spectral monitoring unit comprises a volume phase grating and step (f) comprises separating the extracted portion of the input WDM optical signal into prescribed spectral components with the volume phase grating.

17. The method of claim 14 wherein the first spectral monitoring unit comprises a photo-detector array and step (c) comprises detecting the power level of each of the prescribed spectral components with the photo-detector array.

18. The method of claim 17 wherein the photo-detector array comprises a plurality of photo-detectors operative to detect the power level of a respective one of the spectral components and step (c) comprises detecting the power level of each prescribed spectral component with a respective one of the photo-detectors.

19. The method of claim 14 wherein the second spectral monitoring unit comprises a photo-detector array and step (g) comprises detecting the power level of each of the prescribed spectral components with the photo-detector array.

20. The method of claim 19 wherein the photo-detector array comprises a plurality of photo detectors operative to detect the power level of a respective one of the spectral components and step (c) comprises detecting the power level of each prescribed spectral component with a respective one of the photo-detectors.

21. The method of claim 14 wherein in step (a) the first optical coupler extracts about 2% of the power of the input WDM optical signal.

22. The method of claim 14 wherein in step (e) the second optical coupler extracts about 2% of the power of the output WDM optical signal.

23. The method of claim 14 wherein the optical amplifier is a laser pump source in optical communication with an erbium-doped fiber and step (d) comprises amplifying the input WDM optical signal with the erbium-doped fiber and laser pump source.

24. A method of amplifying an input WDM optical signal with an optical amplifier system having a first and a second optical coupler, a spectral monitoring unit, an optical amplifier and a controller, the method comprising the steps of:
a) extracting a portion of the input WDM optical signal with the first optical coupler;
b) amplifying the input WDM optical signal with the optical amplifier in order to generate an output WDM optical signal;
c) extracting a portion of the output WDM optical signal with the second optical coupler,
e) separating the extracted portion of the input WDM optical signal and the extracted portion of the output WDM optical signal into respective spectral components with the spectral monitoring unit;
f) detecting the power level of the spectral components with the spectral monitoring unit; and
g) controlling the amplification of the input WDM optical signal with the optical amplifier and the controller in response to the power level of the spectral components detected by the spectral monitoring unit.

25. The method of claim 24 wherein the optical amplifier has a laser pump source and an erbium-doped fiber and step (b) comprises amplifying the input WDM optical signal with the laser pump source and the erbium-doped fiber.

26. The method of claim 24 wherein the spectral monitoring unit comprises a volume phase grating and step (e) comprises separating the extracted portion of the input WDM optical signal and the extracted portion of the output WDM optical signal with the volume phase grating.

27. The method of claim 24 wherein the spectral monitoring unit comprises a photo-detector array and step (f) comprises detecting the power level of the spectral components with the photo-detector array.

28. The method of claim 27 wherein the photo-detector array has a plurality of photo-detectors corresponding to the spectral components and step (f) comprises detecting the power level of each of the spectral components with a respective one of the photo-detectors.

29. The method of claim 24 wherein in step (a) the first optical coupler extracts about 2% of the power of the input WDM optical signal.

30. The method of claim 24 wherein in step (c) the second optical coupler extracts about 2% of the power of the output WDM optical signal.

31. The method of claim 24 wherein the spectral monitoring unit has an optical switch and a volume phase grating and step (e) comprises switching between the input WDM optical signal and the output WDM optical signal with the optical switch in order to separate the spectral components with the volume phase grating.

32. An optical amplifier system for amplifying a wavelength division multiplexed (WDM) optical signal, the system comprising:
first coupling means for extracting a portion of the input WDM optical signal;
first monitoring means having a volume phase grating for detecting the power level of spectral components of the extracted input WDM optical signal;
amplifying means for amplifying the input WDM optical signal and generating an amplified output WDM optical signal;
second coupling means for extracting a portion of the output WDM optical signal;
second monitoring means having a volume phase grating for detecting the power level of spectral components of the extracted output WDM optical signal; and control means for controlling the operation of the amplifying means in response to the power level of the spectral components of the extracted input WDM optical signal and the extracted output WDM optical signal.

33. The system of claim 32 wherein the first coupling means and the second coupling means are respective first and second optical couplers.

34. The system of claim 32 wherein the first monitoring means and the second monitoring means are respective first and second spectral monitoring units.

35. The system of claim 32 wherein the amplifying means is a laser pump source and an erbium-doped fiber.

36. A system for amplifying an input optical signal, the system comprising:

first coupling means for extracting a portion of the power of the input optical signal;

amplifying means for amplifying the input optical signal;

second coupling means for extracting a portion of the power of the output optical signal;

monitoring means having a volume phase grating for separating spectral components of the extracted input and output optical signals and determining the power level of the spectral components; and control means for controlling the operation of the amplifying means in response to the power level of the spectral components.

37. The system of claim 36 wherein the first and second coupling means are respective first and second optical couplers.

38. The system of claim 36 wherein the monitoring means is a spectral monitoring unit.

39. The system of claim 36 wherein the amplifying means is a laser pump source and an erbium-doped fiber.

* * * * *